(12) United States Patent
Brockhoff

(10) Patent No.: US 7,404,587 B2
(45) Date of Patent: Jul. 29, 2008

(54) MOTOR VEHICLE

(75) Inventor: Franz-Ulrich Brockhoff, Bramsche (DE)

(73) Assignee: Wilhelm Karmann GmbH, Osnabrück (DE)

( * ) Notice: Subject to any disclaimer, the term of this patent is extended or adjusted under 35 U.S.C. 154(b) by 0 days.

(21) Appl. No.: 10/535,648

(22) PCT Filed: Nov. 18, 2003

(86) PCT No.: PCT/DE03/03815

§ 371 (c)(1),
(2), (4) Date: Dec. 27, 2005

(87) PCT Pub. No.: WO2004/045880

PCT Pub. Date: Jun. 3, 2004

(65) Prior Publication Data

US 2006/0125281 A1     Jun. 15, 2006

(30) Foreign Application Priority Data

Nov. 21, 2002 (DE) ................................ 102 54 366

(51) Int. Cl.
*B60J 7/00* (2006.01)
(52) U.S. Cl. ........................ 296/107.17; 296/107.07
(58) Field of Classification Search ............ 296/107.01, 296/107.17, 116, 117, 107.07, 107.19, 107.2, 296/107.08
See application file for complete search history.

(56) References Cited

U.S. PATENT DOCUMENTS

| 6,832,805 | B2 * | 12/2004 | Quindt et al. | 296/107.08 |
| 7,172,236 | B1 * | 2/2007 | Chevtsov et al. | 296/107.17 |
| 2002/0105205 | A1 | 8/2002 | Willard | |
| 2005/0280280 | A1 * | 12/2005 | Heselhaus | 296/107.15 |

FOREIGN PATENT DOCUMENTS

| DE | 36 25 628 | 2/1988 |
| DE | 39 30 343 | 3/1991 |

OTHER PUBLICATIONS

Patent Abstracts of Japan, vol. 0101, No. 15 (M-474), Apr. 30, 1986 & JP 60 244240 A (Takashi Adachi), Dec. 4, 1985.

* cited by examiner

*Primary Examiner*—Joseph D Pape
(74) *Attorney, Agent, or Firm*—Friedrich Kueffner

(57) ABSTRACT

A motor vehicle includes a roof having at least one part which can be moved as a whole between an opened position and a closed position and which, in the closed position, extends between an area near a wind shield frame and a rear rigid roof part. The rear rigid roof part includes two lateral tips which, when the roof is closed, are overlapped on their upper side by frame parts which can be moved upward to create an opening for the passage of the movable roof part. The roof has a rear window which is mounted relatively far towards the front so that the rear window is not window is not moved upwardly when the frame parts are moved upwardly.

11 Claims, 9 Drawing Sheets

MOTOR VEHICLE

BACKGROUND OF THE INVENTION

1. Field of the Invention

The invention concerns a motor vehicle with a roof that has at least one part that can be moved as a whole to open the roof in accordance with the introductory clause of claim 1.

2. Description of the Related Art

U.S. 2002/0105205 describes a vehicle in which the rear roof part can be moved as a whole to create an opening for the passage of a front roof part, which can be lowered completely below the rear roof part. For this purpose, the entire mass of the rear roof part must be moved, which requires correspondingly large-sized drive mechanisms, which limit the available luggage space. Since most of the mass of the rear roof part is located far from the rear-end axis of rotation, a considerable torque must be applied to swing open the rear roof part. Consequently, opening also takes a relatively long time.

SUMMARY OF THE INVENTION

The invention is based on the problem of creating improved conditions for opening the roof of a motor vehicle with a roof that has at least one front roof part that can be moved as a whole between an open and a closed position.

In accordance with the invention, the mass that must be moved to open or close the movable part of the roof and the moment of inertia of the rear roof part that opposes the rotational motion are considerably reduced. In particular, a rear window does not have to be swiveled. Nevertheless, the opening of a large passage for the movable roof part is ensured. The pivot drives can be made smaller, so that the luggage compartment can be enlarged.

An increase in the stability of the section of the rear roof part that is being swung open is possible if the lateral frame parts that are being swung open are joined with each other by a front transverse frame part.

A further reduction of mass and moment of inertia can be realized by the use of light construction materials, especially plastics, for the frame parts.

To allow fast opening and preserve luggage space, the movable roof part is divided in such a way that it can be varied between a narrowed width and a normal width by displacement of the outer sections and can be moved in its state of narrowed width between its open position and its closed position.

In particular, the outer sections can be swung in towards the middle section to adjust to the narrowed position.

With the provision of a linkage guided in the lateral fins, the entire movement mechanism can be supported there in a visually inconspicuous way, especially when the fins are closed both towards the outside and in the direction of a vertical longitudinal center plane of the vehicle over at least a broad area, and the linkage is guided between outer and inner linings.

In a fin roof of this type, the movable roof part, even when it occupies, in its normal width, the entire width between the side windows, can be lowered between the fins by inward displacement of the lateral sections.

BRIEF DESCRIPTION OF THE DRAWING

Other advantages and features of the invention are explained below with reference to the specific embodiments of the object of the invention illustrated in the drawings.

DETAILED DESCRIPTION OF THE INVENTION

Figure 1:
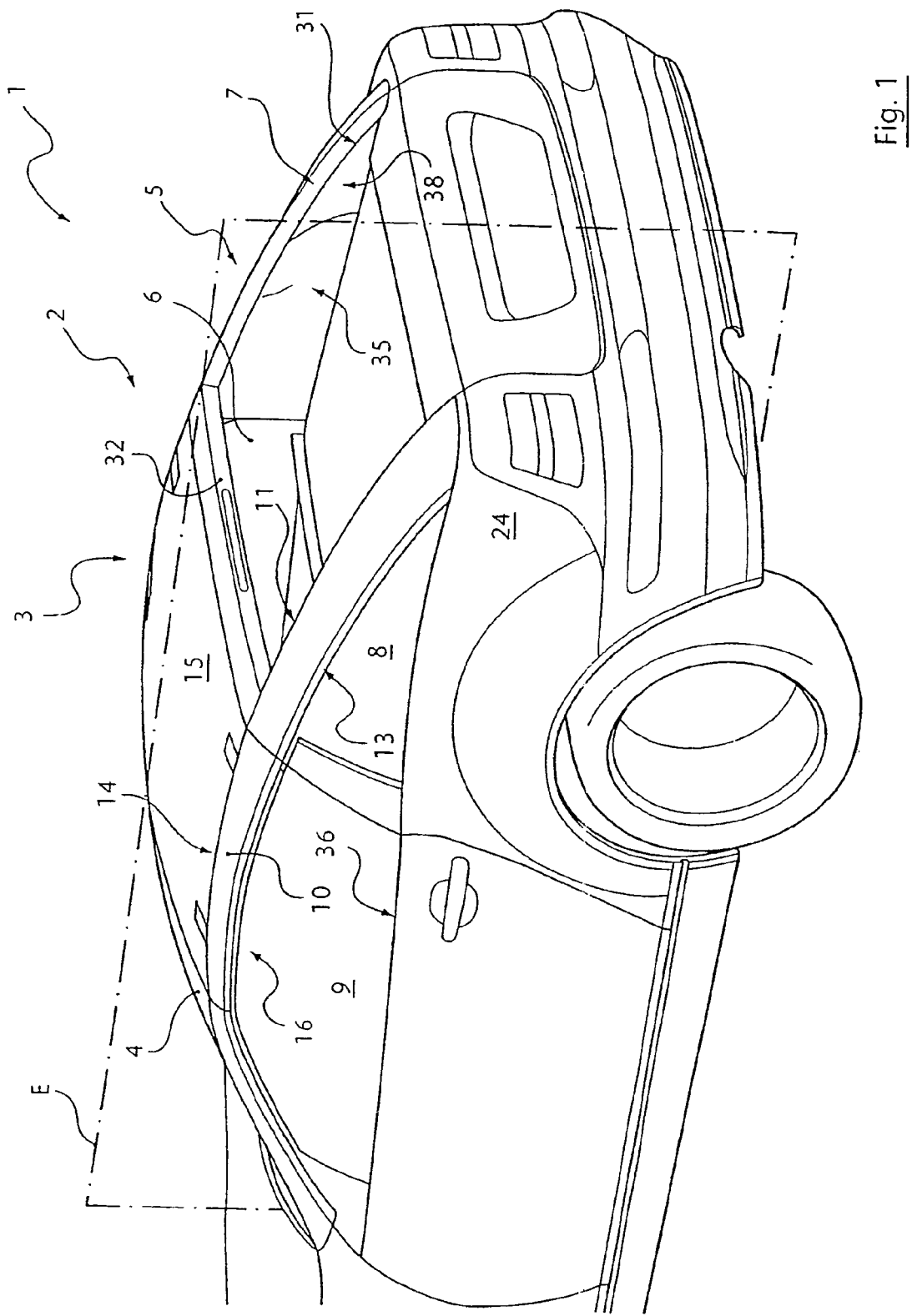
FIG. 1 shows a schematic, perspective overall view, which is broken off at the front, of a first motor vehicle in accordance with the invention with a transverse frame part that joins the lateral frame parts of the rear roof part with the roof closed.
Figure 2:
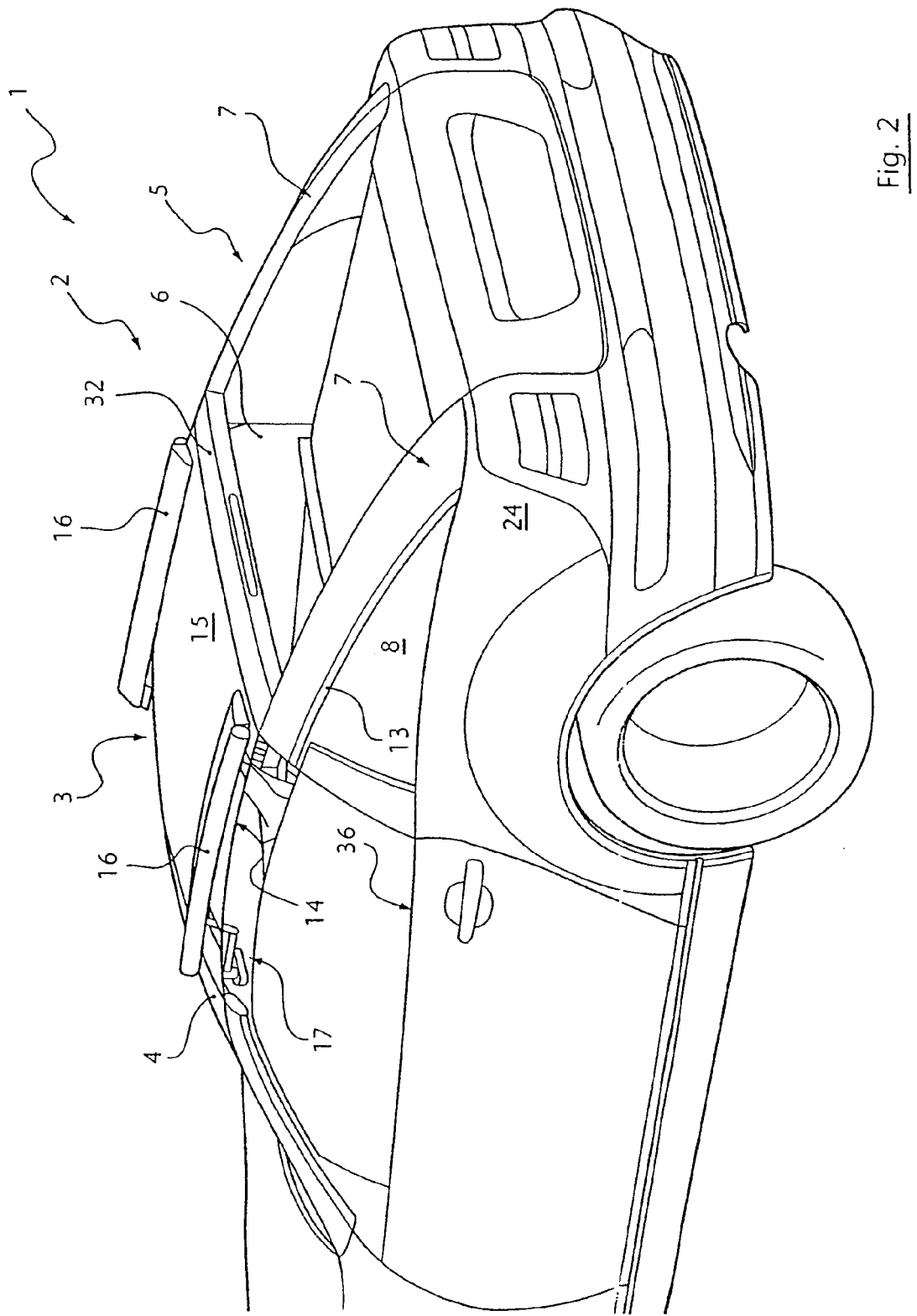
FIG. 2 shows a view similar to that of FIG. 1 with the outer sections of the front roof part swung open towards the middle section.

FIGS. 1 to 4 and 6 to 9 show a first embodiment of a motor vehicle 1 in accordance with the invention. The motor vehicle has a roof 2, which has at least one openable front roof part 3. It is also possible for the roof to have several movable roof parts 3. In the present case, there is exactly one front roof part 3, which extends in the longitudinal direction of the vehicle from a windshield frame 4 to a rear roof part 5. In the illustrated embodiment, the rear roof part 5 encloses an essentially vertical rear window 6. It is not necessary for the front, movable roof part 3 to be directly attached, as shown here, to the windshield frame 4.

The roof 2 is designed as a so-called fin roof, i.e., in addition to the rear window 6, which is installed relatively far towards the front, it has tips 7 (often referred to as fins), which run laterally towards the rear and extend essentially in the longitudinal direction of the vehicle and which can be provided, for example, on the outside, with additional side windows 8. Visual shielding of the fins 7 with opaque linings 8, including, for example, tinted windows, is also possible. The rear window 6, which is located between the fins 7, can be lower able.

The movable roof part 3 is positioned essentially horizontally when the roof 2 is closed; in the present embodiment, it extends over the entire width of the passenger compartment, and in the closed state, it is in contact with the upper edges of preferably lower able side windows 9.

This contact is produced by sections 10 of frame parts, which are labeled as a whole with reference number 11. Locking tongues or other positive-locking joining elements can be used to secure the sections 10 on the A-posts 12 of the windshield frame 4 and on the C-posts 13 of the rear roof part 5. In addition, the sections 10 are movably connected at separating lines 14 with a middle section 15 of the front roof part 3.

The movable roof part 3 can be formed as a whole both by several rigid panels and by framework constructions, which are covered by a flexible covering.

The outer sections 16 can be moved between a normal position, in which they are flush with the middle section 15, and in which the roof part 3 has its full normal width (FIG. 1), and a position, in which they are inwardly displaced towards the middle section (FIG. 2), and in which the front roof part 3 is narrowed. This displacement is a rotational displacement, which is produced by two multipoint linkages 17 on each side of the vehicle. Simple swinging hinges can also be used. Besides the illustrated inward rotation of the outer section 16, other types of displacement are also possible in principle, including, for example, parallel running in of the outer sections 16 in a translational motion. When the outer sections 16 are swung in, they are positioned in the narrowed position, in which they are rotated 90° towards the middle section 15.

In this narrowed position, the lateral frame parts 11 are interrupted between the A-posts 12 and the C-posts 13, and the front roof part 3 can be opened towards the rear between the tips 7 of the fin roof.

Figure 3:
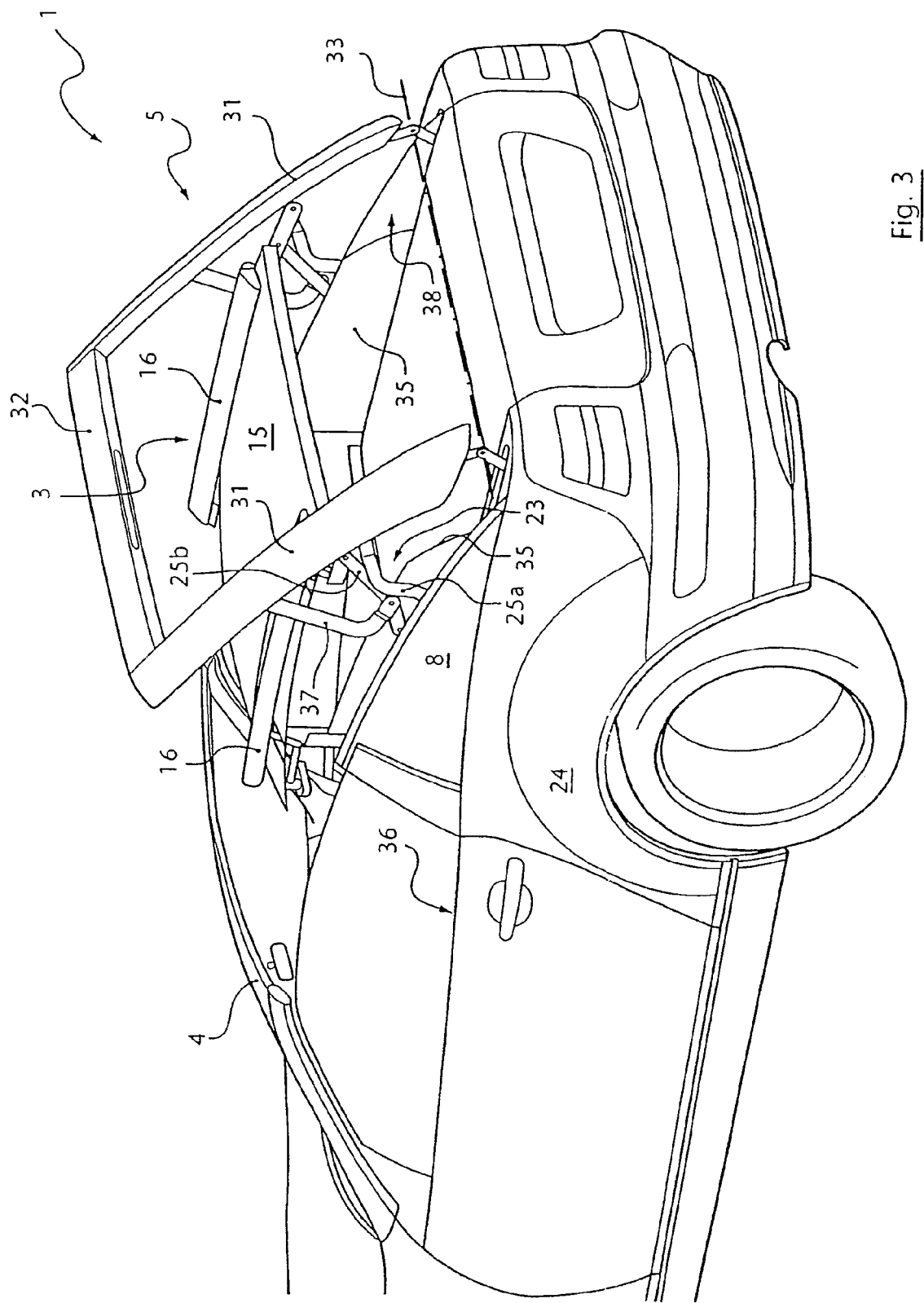
FIG. 3 shows a view similar to that of FIG. 2 with frame parts of the rear roof part swung open during the opening movement of the front roof part in its state of narrowed width.

To this end, the middle section 15 of the roof part 3 has an independent linkage 23, on which it is movably supported relative to the automobile body 24. The linkage 23 is visually concealed at the sides by the outer linings 8 of the tips 7 of the fin roof. Its links 25a, 25b are guided in slotted recesses, which lie parallel to the fins 7 and extend essentially over their entire length (FIG. 3). The linkage 23 can be moved, for example, by an electric or hydraulic driving mechanism 26, which is supported at one end in a fixed position with respect to the automobile body and acts on a link 25a with its other end. The link 25a is likewise supported on the pivot joint 27 in such a way that it is fixed with respect to the automobile body and acts on the front link 25b via two swivel levers 28, 29, of which the latter is supported on the joint 30 in such a way that it is fixed with respect to the automobile body. This results in the formation of a multipoint linkage, which allows an initially essentially linear displacement of the roof part 3 to open it. The lowered position of the opened roof part 3 can also lie essentially horizontally between the fins 7 (FIG. 4), and in this position, the outer sections 16 remain in their swung-in position.

The actuation of the swiveling movement of the outer sections 16 of the roof part 3 can be remotely controlled from the dashboard, as can the total movement to open or close it and to open or close frame parts 31, 32 of the rear roof part 5, which is explained in greater detail below. The sequences of movements can be coupled with one another by program logic or by automatic mechanical control in order to avoid operating errors.

To allow the opening of the narrowed roof part 3 and to create an opening for its passage, a part of the rear roof part 5 swings open, as is shown, for example, in FIG. 3. In this first embodiment, a U-shaped frame 31, 32 swings open. This frame is formed of lateral cover frame parts 31 that rest on the fins 7 and are joined with each other by a transverse frame part 32 that swings open with the lateral frame parts 31. The frame parts 31, 32 can be made of a light construction material, for example, plastic or light-metal foam material. In the closed position, the lateral frame parts 31 cover the slot region, in which the linkage 23 is guided and which is formed between outer linings 8 and inner linings 35 of the fins 7, which (inner linings 35) are directed towards the longitudinal center plane E of the vehicle. In the position in which the frame parts are swung open, the slot recesses for the linkage 23 are freely accessible. The transverse frame part 32 covers the almost vertical or completely vertical rear window 6 and possibly a roll over protection device installed in the vicinity of the B-post.

Figure 4:
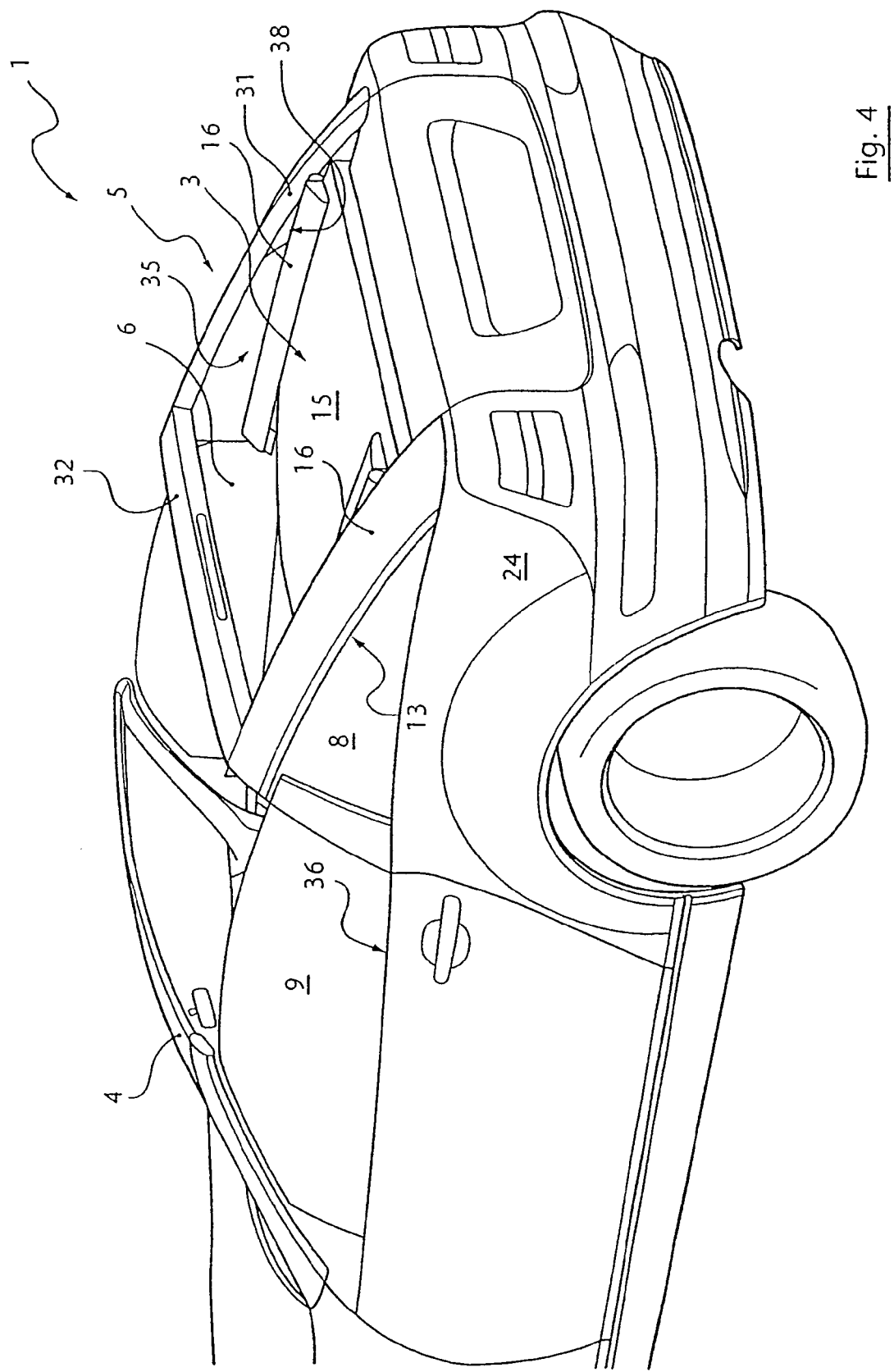
FIG. 4 shows a view similar to that of FIG. 3 with the movable roof part completely lowered and the swivel frame of the rear roof part closed.

The rotational movement occurs about a horizontal axis 33 towards the rear end. The axis must not be fixed with respect to the automobile body but rather is connected with the link 25b by a coupling lever 34, so that it rises above the belt line 36 when the driving mechanism 26 is moved in. Another coupling lever 37, which is connected with the link 25b, is provided to allow the frame parts 31, 32 to rotate about the axis 33. In this open position of the frame parts 31, 32, the linkage 23 can move freely and thus move the front roof part 3 between its closed position and its open position. As a result of the fact that the inner linings 35 do not extend all the way to the rear end regions of the fins 7 but rather leave an open region 38 towards the fins 7, the frame parts 31, 32 can be closed again over the front roof part 3, which has been horizontally lowered between the fins (FIG. 4). The connections of the linkage 23 to the roof part 3 can then be located in this open region 38. As shown in FIG. 4, a vehicle with a targa roof is formed.

Figure 5:
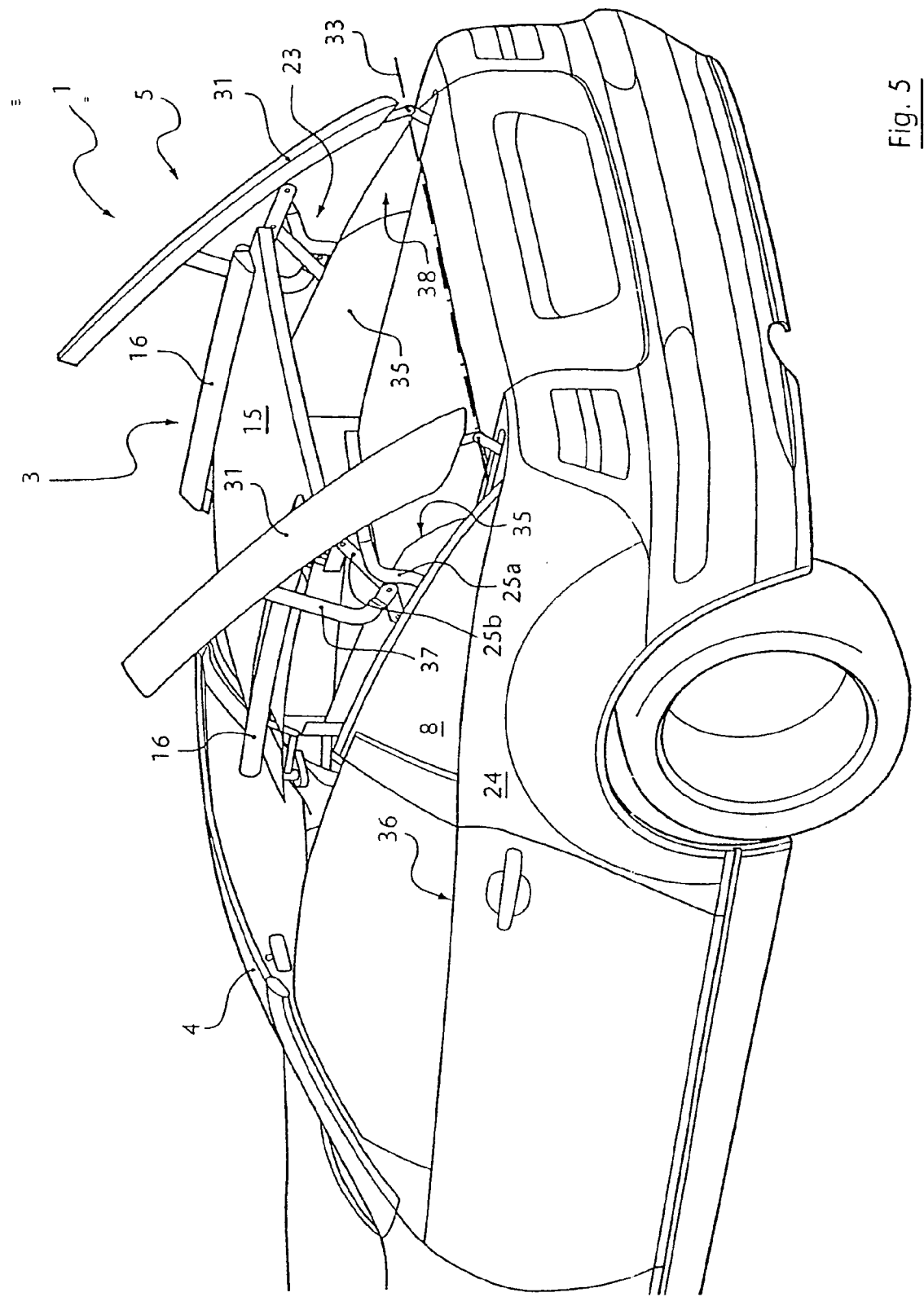
FIG. 5 shows a view similar to that of FIG. 3 with an alternative rear roof part, which comprises only longitudinal frame parts that can be swung open without a transverse frame part joining them at the front.
Figure 6:
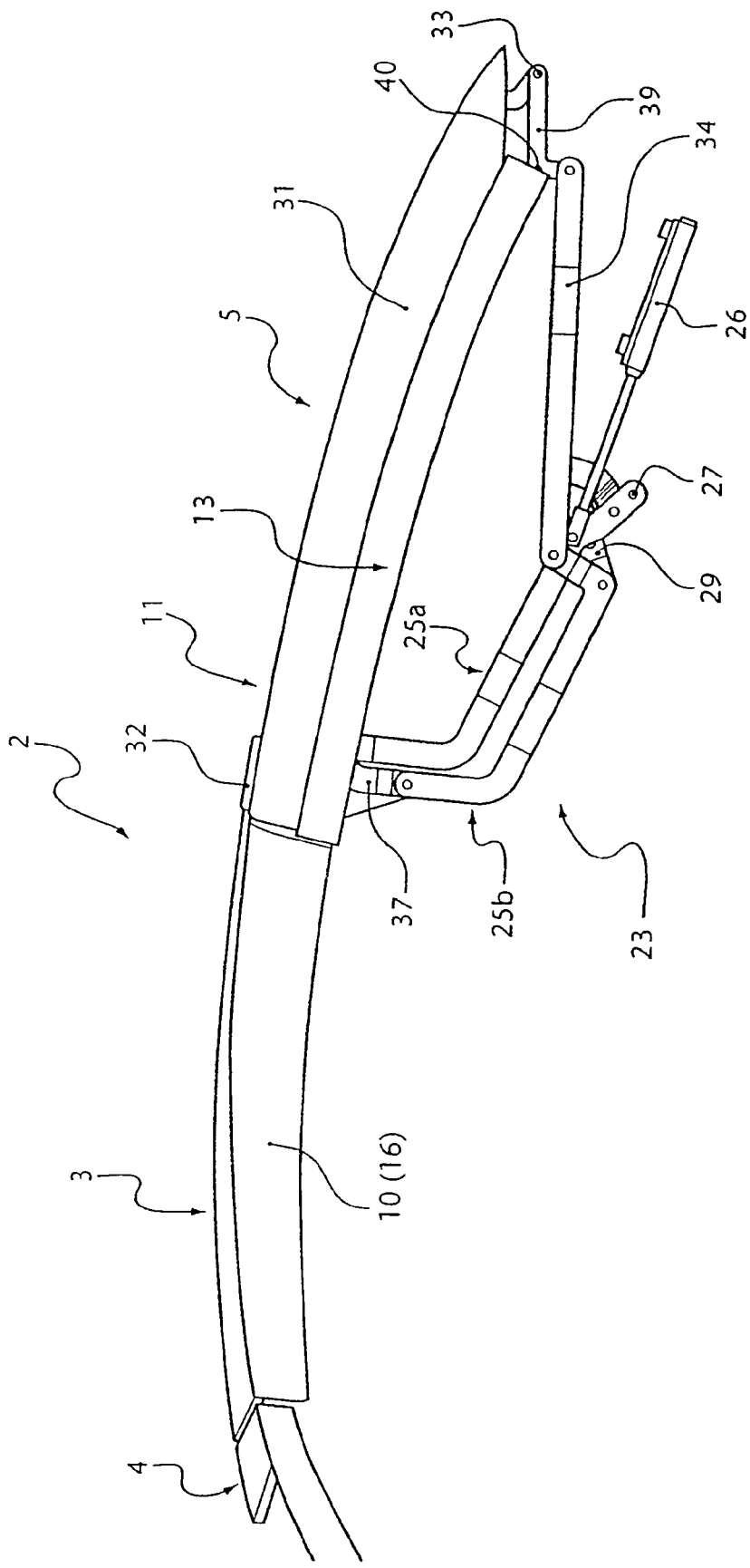
FIG. 6 shows a schematic side view of the roof in the position shown in FIG. 1.
Figure 7:
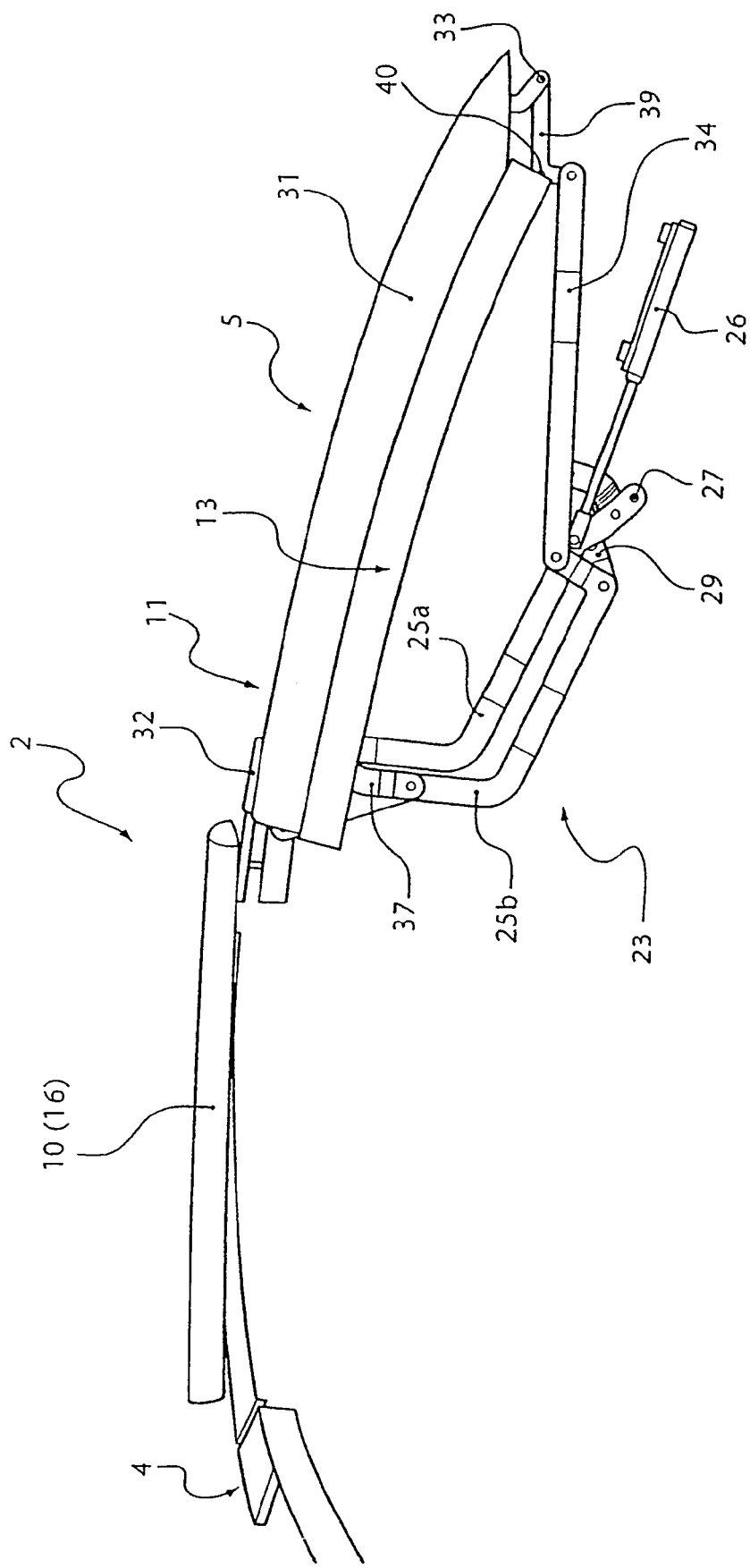
FIG. 7 shows a schematic side view of the roof in the position shown in FIG. 2.
Figure 8:
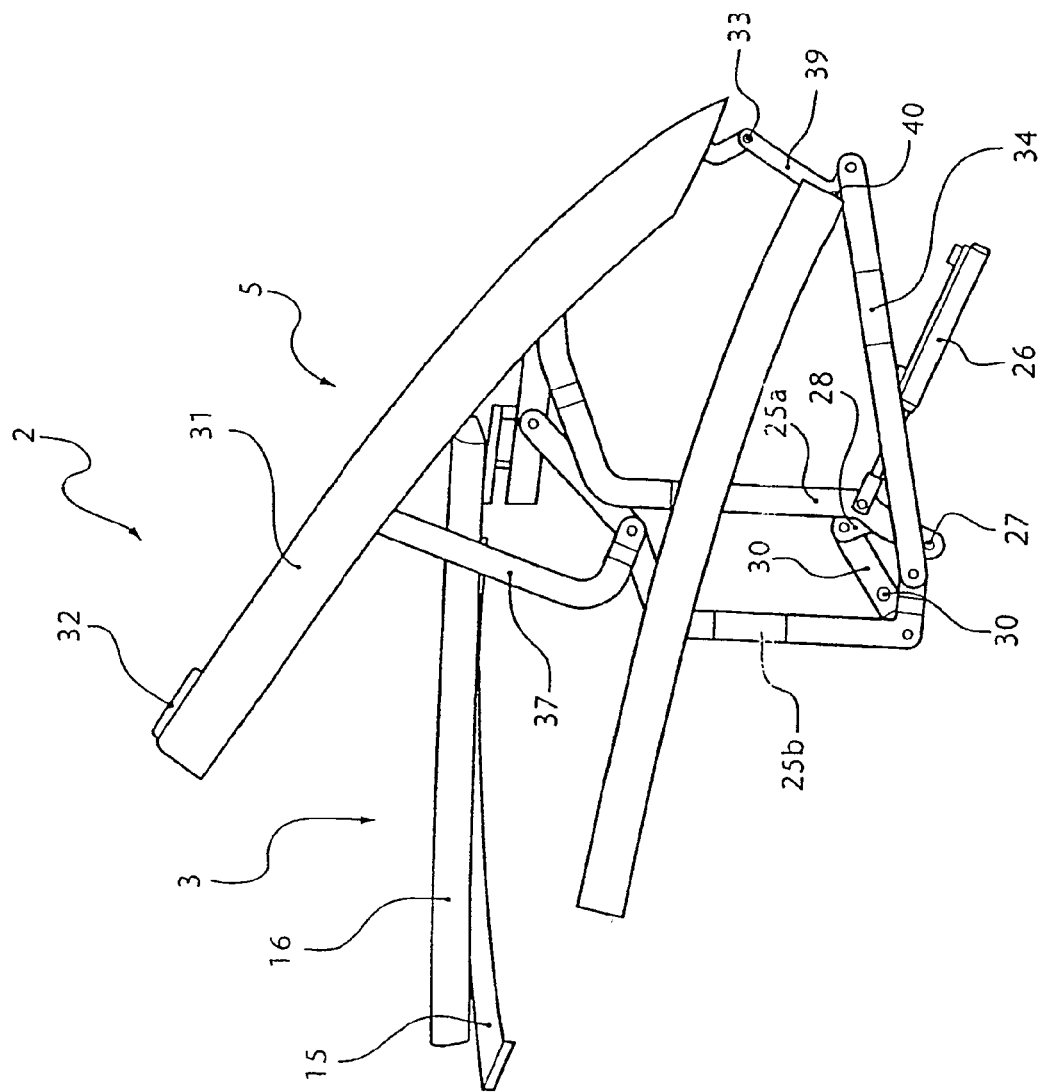
FIG. 8 shows a schematic side view of the roof in the position shown in FIG. 3.
Figure 8:
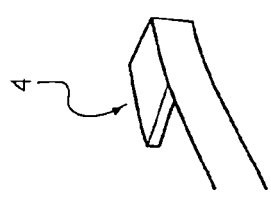
Figure 9:
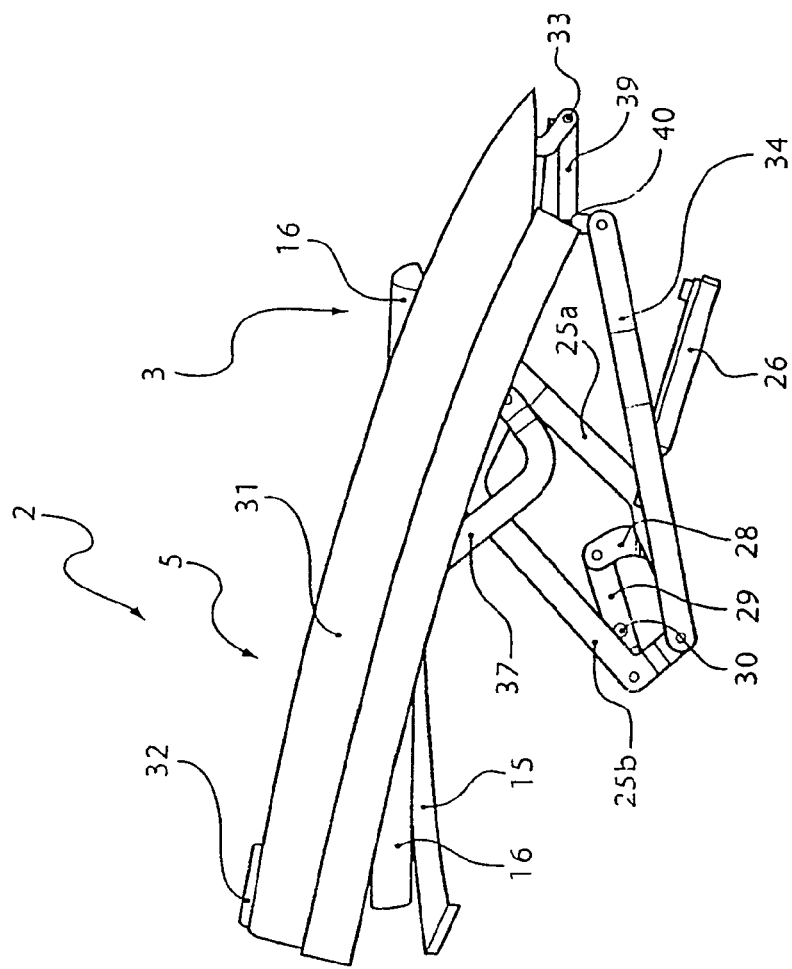
FIG. 9 shows a schematic side view of the roof approximately in the position shown in FIG. 4.
Figure 9:
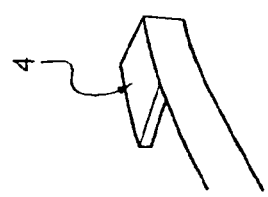

FIG. 5 shows an alternative embodiment, in which the lateral, longitudinally extending frame parts 31 are not joined with each other by a transverse frame part 32. Therefore, only lateral, longitudinally extending frame parts 31 are moved to create an opening for the passage of the front roof part 3. These frame parts 31 can be joined with each other in the area of the axis of rotation 33, so that here too only one drive is necessary for the rotational motion. The opening kinematics for the roof parts 3 and 5 are otherwise unchanged.

Depending on the design of the vehicle, it can also be possible for the rear roof part 5 to be lowered over the lowered front roof part 3 below the belt line 36, in which case a full convertible vehicle is formed.

In addition, a roll over protection device can be provided in the area of the B-posts and the rear window. The opening for the passage of the movable roof part 3 then lies above the rollover protection device and is thus not restricted by the rollover protection device. In this regard, an especially cost-effective solution is a rigid roll over protection device.

The invention claimed is:

1. A motor vehicle (1) with a roof (2) that has at least one part (3) which can be moved as a whole between an open position and a closed position and which, in the closed position, extends between an area near a windshield frame (4) and a rear, rigid roof part (5), wherein the rear roof part (5) comprises two lateral tips (7) which, when the roof (2) is closed, are overlapped on their upper side by frame parts (31), which can be moved upward to create an opening for the passage of the movable roof part (3), wherein the roof (2) has a rear window (6) mounted far towards the front, such that the rear window (6) is not moved upwardly when the frame parts (31, 32) are moved upwardly.

2. Motor vehicle in accordance with claim 1, wherein the frame parts (31) can be swung open about a rear axis (33) and swung closed again over the opened roof part (3).

3. Motor vehicle in accordance with claim 1, wherein a transverse frame part (32), which overlaps a rear window (6) situated between the fins (7), can also be swung open and closed along with the lateral frame parts (31) of the rear roof part (5).

4. Motor vehicle in accordance with claim 1, wherein the overlapping frame parts (31; 32) of the rear roof part (5) are made of a light construction material.

5. Motor vehicle in accordance with claim 1, wherein the rotation of the frame parts (31; 32) can be effected by a remotely controlled drive (26).

6. Motor vehicle in accordance with claim 5, wherein the drive (26) is connected with the opening movement of the front outer sections (16) by program control.

7. Motor vehicle in accordance with claim 6, wherein the movable roof part (3) is divided into several connected sections (15; 16) in such a way that the movable roof part can be varied between a normal width and a narrowed width by displacement of the other sections (16), and, when the movable roof part is in the state of narrowed width, the movable roof part can be moved between the open position and the closed position.

8. Motor vehicle in accordance with claim 7, wherein the movable roof part (3) is divided into a middle section (15) with respect to a vertical longitudinal center plane (E) and two outer sections (16), which can be swung inward towards the middle section (15) to adjust to the narrowed position.

9. Motor vehicle in accordance with claim 1, wherein the movable roof part (3) can be lowered in an essentially horizontal open position above a rear-end, essentially horizontal region of the automobile body, especially a trunk lid.

10. Motor vehicle in accordance with claim 1, wherein the front roof part (3) is supported on a linkage (23) in such a way that the front roof part can be independently moved and that the front roof part can be moved by the linkage (23) between the open position and the closed position.

11. Motor vehicle in accordance with claim 10, wherein the linkage (23) is supported within the lateral tips (7) of the rear roof part (5) and overlapped by the lateral frame parts (31) when the roof (2) is closed.

* * * * *